(12) United States Patent  
Drechsler et al.

(10) Patent No.: US 7,667,352 B2
(45) Date of Patent: Feb. 23, 2010

(54) ENERGY TRANSMISSION DEVICE

(75) Inventors: Eberhard Drechsler, Dresden (DE); Thomas Komma, Ottobrunn (DE)

(73) Assignee: BSH Bosch und Siemens Hausgeraete GmbH, Munich (DE)

( * ) Notice: Subject to any disclaimer, the term of this patent is extended or adjusted under 35 U.S.C. 154(b) by 149 days.

(21) Appl. No.: 11/920,392

(22) PCT Filed: Feb. 21, 2006

(86) PCT No.: PCT/EP2006/060120

§ 371 (c)(1),
(2), (4) Date: Nov. 13, 2007

(87) PCT Pub. No.: WO2006/120044

PCT Pub. Date: Nov. 16, 2006

(65) Prior Publication Data

US 2009/0045681 A1    Feb. 19, 2009

(30) Foreign Application Priority Data

May 13, 2005  (DE) .................. 10 2005 022 352

(51) Int. Cl.
*H01F 38/00* (2006.01)
(52) U.S. Cl. .................................. 307/104
(58) Field of Classification Search .......... 307/104
See application file for complete search history.

(56) References Cited

U.S. PATENT DOCUMENTS 5,455,467 A * 10/1995 Young et al. ............... 307/104

7,212,414 B2 * 5/2007 Baarman ...................... 363/16
2003/0069051 A1   4/2003 Pretre et al.
2004/0130915 A1 * 7/2004 Baarman .................. 363/21.02
2004/0218406 A1  11/2004 Jang et al.
2005/0068019 A1   3/2005 Nakamura et al.

FOREIGN PATENT DOCUMENTS

| DE | 196 49 682 |   | 6/1998 |
| JP | 2000-134830 | * | 5/2000 |
| JP | 2000-197275 |   | 7/2000 |
| JP | 2000-217277 |   | 8/2000 |

OTHER PUBLICATIONS

Machine translation of JP2000-134830.*
International Search Report PCT/EP2006/060120.

* cited by examiner

*Primary Examiner*—Fritz M Fleming
(74) *Attorney, Agent, or Firm*—James E. Howard; Andre Pallapies

(57) ABSTRACT

The invention relates to an energy transmission device having a primary coil for transmitting to a detachable secondary coil electromagnetic energy by induction with the electromagnetic energy being characterized by an energy transmission frequency and sensing component for detecting at least one characteristic variable of a detachable secondary end including the secondary coil. The sensing component is adapted to detect information on the presence of a detachable secondary end in an especially reliable manner. For this purpose, the sensing component couples a measuring voltage having a measuring frequency that is different from the energy transmission frequency into the secondary coil.

9 Claims, 5 Drawing Sheets

ENERGY TRANSMISSION DEVICE

Figure 1:
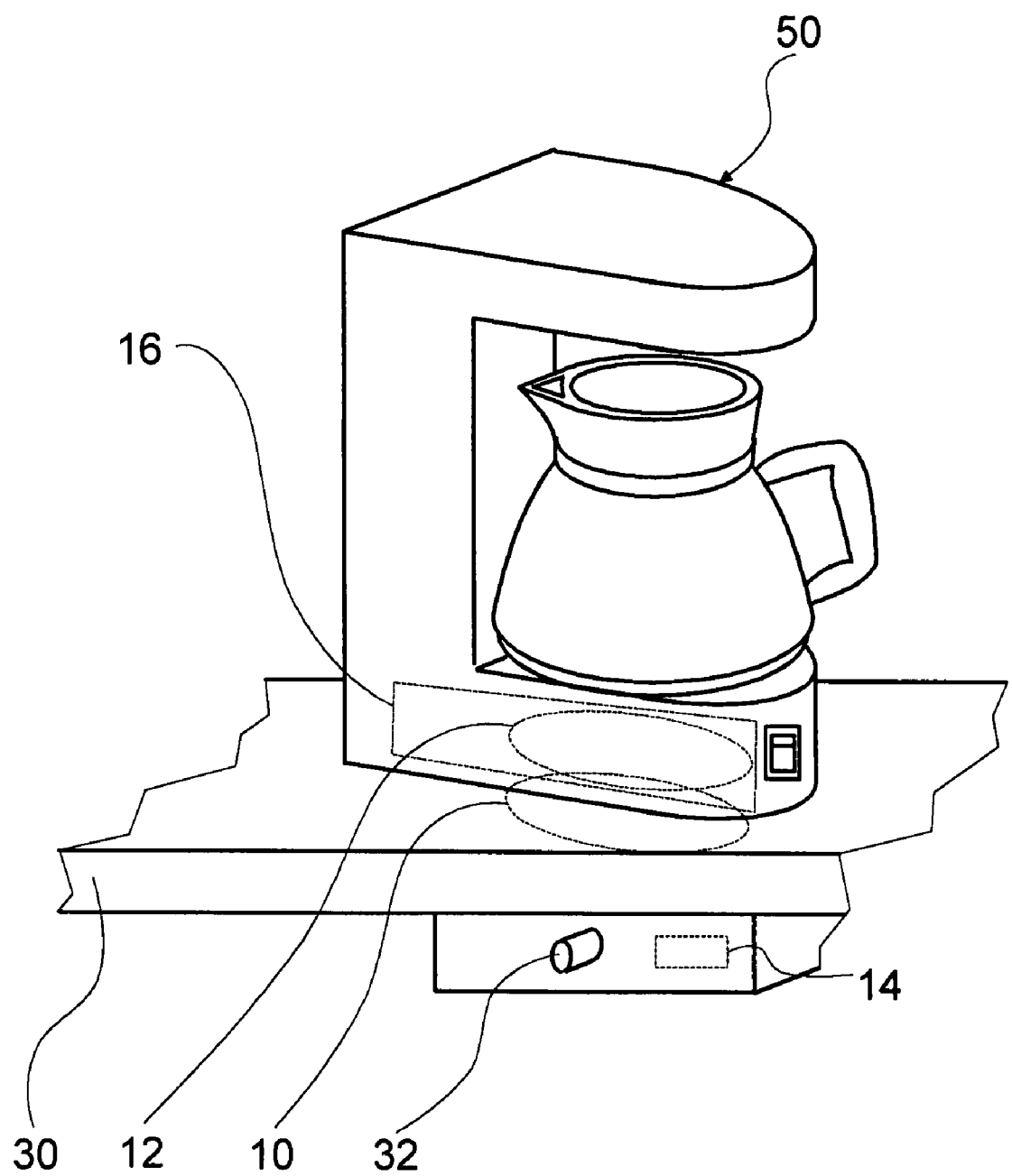

The invention is based on an energy transmission device as claimed in the preamble of claim 1.

An energy transmission device with a primary coil for inductive transmission of electromagnetic energy at an energy transmission frequency to a detachable secondary coil is known. The known energy transmission device also includes a sensing means for detecting a primary-side working current which forms a characteristic value for a load resistance of a secondary side comprising the secondary coil.

The object of the invention especially consists of providing a generic energy transmission device of which the sensing means can detect in a particularly safe manner information about the presence of a detachable secondary side. A further object of the invention consists of at least reducing a strain imposed on an environment by electromagnetic radiation when the secondary side is detached.

The object is achieved in accordance with the invention by the features of claim 1, while advantageous embodiments and developments of the invention can be taken from the subclaims.

The invention is based on an energy transmission device with a primary coil for inductive transmission of electromagnetic energy at an energy transmission frequency to a detachable secondary coil and with a sensing means for detecting at least one characteristic value of a detachable secondary side comprising the secondary coil.

It is proposed that the sensing means couples a measurement voltage with a measurement frequency which differs from the energy transmission frequency into the secondary coil. This enables the sensing means to be at least largely independent of a load impedance or impedance of the secondary side. This means that the energy transmission device can be used for an especially large diversity of possible secondary sides or secondary-side devices. A scattering of electromagnetic radiation after the removal of the secondary side can be avoided, since such a removal and an unsuitable secondary side can be safely detected.

Generic energy transmission devices are in demand for wireless energy transmission in any application which appears useful to the person skilled in the art. Because of the option of wireless contacting applications of the inductive energy transmission device are conceivable in areas in which there is a particular explosion hazard. Because of the lack of plug-in contacts, applications in areas that are subject to intensive cleaning or at risk from contamination, for example in kitchens, are especially advantageous. In the latter case for example the primary coil can be integrated into a kitchen working surface and the secondary side can be formed by various movable kitchen appliances. Further advantageous applications are magnetic tracks and charging stations for accumulators, especially for accumulators in electrically-driven automobiles.

In a development of the invention it is proposed that the energy transmission device includes at least one capacitor for expanding at least one coil into an electromagnetic resonant circuit. The coil can be the primary coil, the secondary coil or a further coil. A resonance magnification factor can be achieved by the resonant circuit in the range of a resonant frequency which reacts particularly sensitively to the presence or to the absence of the secondary-side module. Especially when the sensing means detects the resonance magnification factor the sensing means can be designed by the resonant circuit to be particularly sensitive. This applies all the more of the closer the resonant frequency of the resonant circuit lies to the measurement frequency. Thus the resonant frequency of the resonant circuit especially advantageously corresponds at least essentially to the measurement frequency, with deviations of the order of magnitude of a width of the resonance of the resonant circuit still being able to be tolerated An especially effective coupling between primary side and secondary side can be achieved if the energy transmission device includes both a primary side resonant circuit and also a secondary side resonant circuit, with the two resonant circuits able to have a resonant frequency for obtaining an optimum coupling which is essentially the same and essentially corresponds to the measurement frequency. Especially advantageous are embodiments of the invention in which the primary-side resonant circuit is embodied as a parallel resonant circuit and in which the secondary-side resonant circuit is embodied as a series resonant circuit.

An especially fault-free measurement process can be achieved if the measurement frequency is coupled inductively into the primary coil. In principle however a capacitive coupling-in is also conceivable.

If the energy transmission device includes a switching means for activating and/or deactivating an energy transmission as a function of the characteristic value sensed, it can be ensured that the energy transmission device is deactivated in such situations in which otherwise a danger would arise of too high a strain imposed on the environment by electromagnetic fields. The switching means can deactivate the energy transmission especially advantageously whenever the sensing means does not detect a suitable secondary side. This in particular will allow valid emission thresholds to be adhered to despite high energy transmission power and/or emission levels to be kept well below said thresholds, since the energy transmission with the secondary side detached automatically switches off an energy transmitting radiation with high amplitude and only a measurement radiation with the measurement frequency is emitted which does not lead to any significant radiation load.

If the energy transmission device, in addition to the sensing means, includes a means for detecting a primary-side operating current, a further characteristic value of the secondary side can be determined, and from the two characteristic values it can be safely deduced that the secondary side is suitable for energy transmission. The transmission of energy to unsuitable metallic objects which could for example overheat because of the energy transmitted can be avoided.

Especially when the measurement frequency corresponds to a resonant frequency particularly clear information can be derived from the measured value detected by the sensing means if the sensing means is provided for detecting an impedance of the secondary coil at the measurement frequency.

Further advantages emerge from the description of the drawing given below. The drawing shows an exemplary embodiment of the invention. The drawing, the description and the claims contain numerous features in combination. The person skilled in the art would expediently also consider the features individually and combine them into further sensible combinations.

Figure 2:
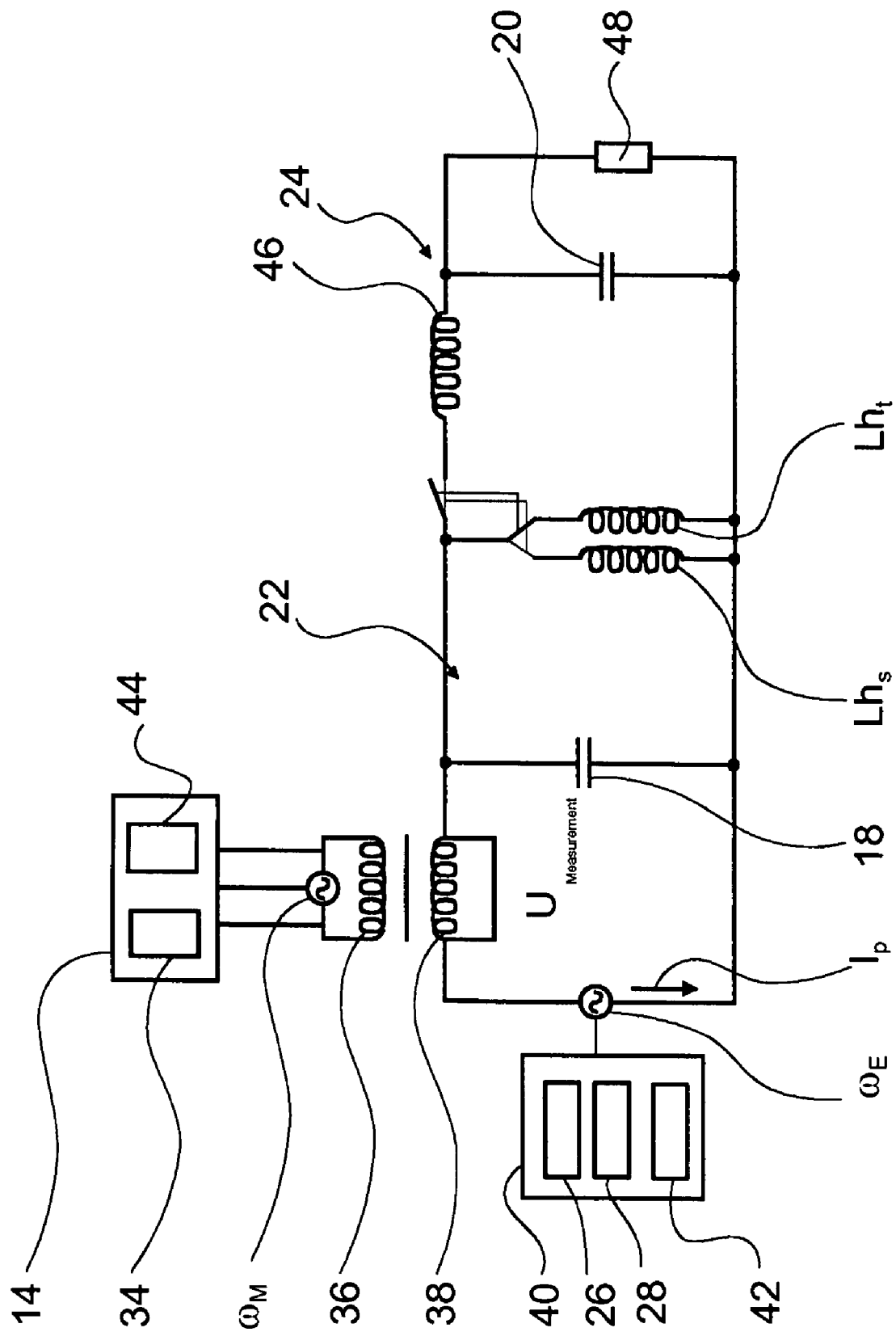
Figure 3:
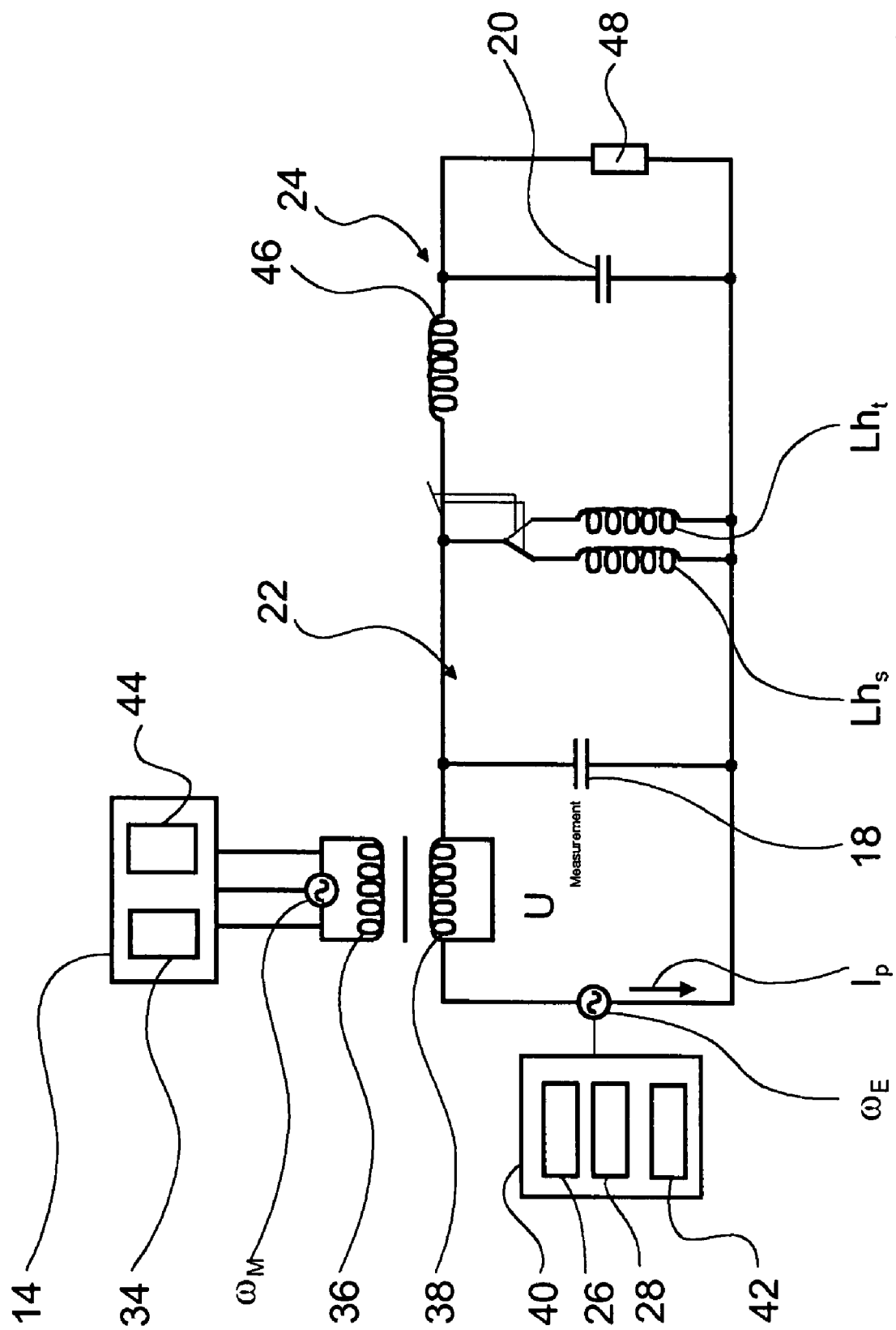
Figure 4:
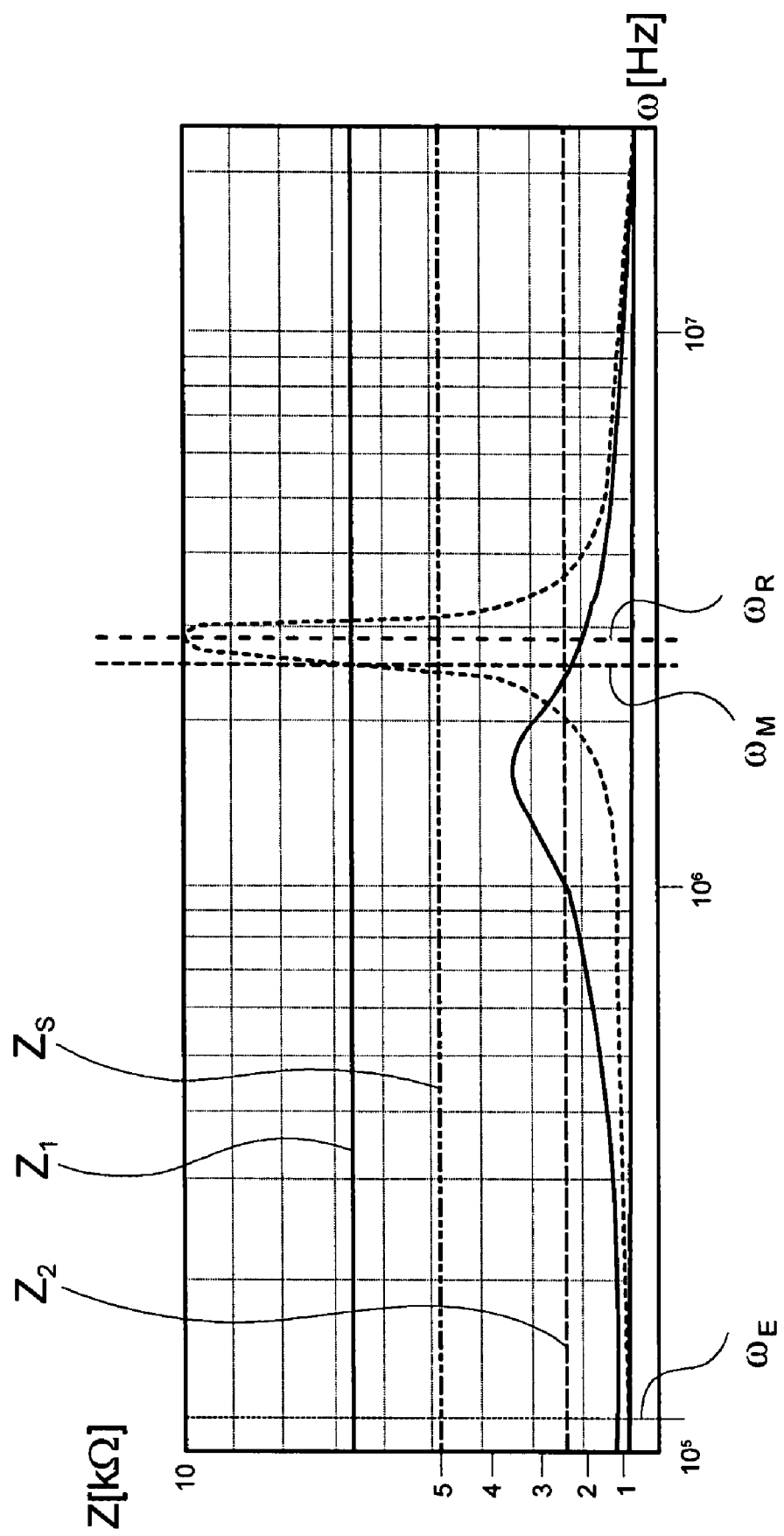
Figure 5:
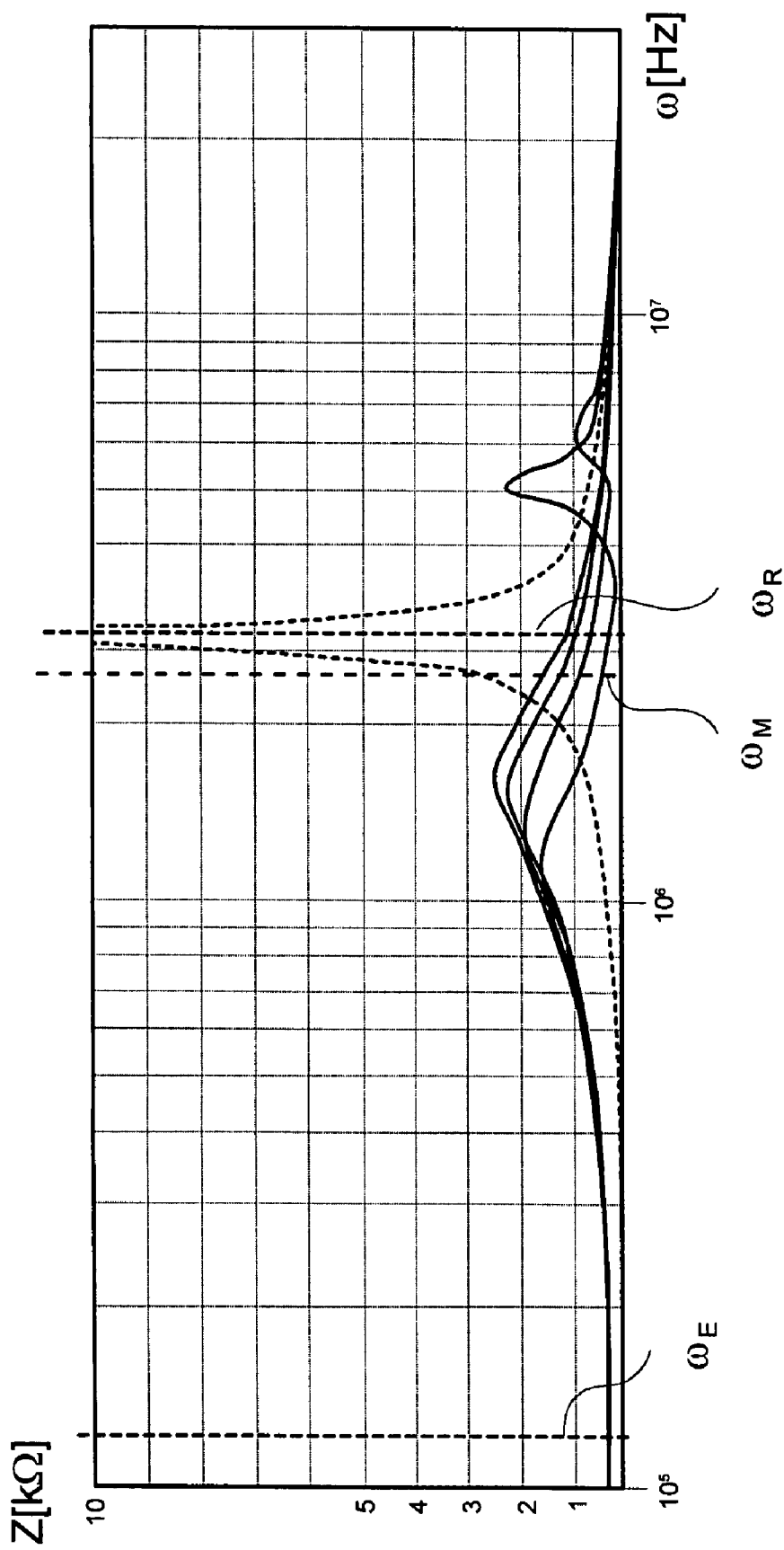

The figures show:

FIG. 1 an energy transmission device with a primary coil and a secondary side with a secondary coil, FIG. 2 a basic circuit diagram of the energy transmission device with the secondary side connected, FIG. 3 a basic circuit diagram of the energy transmission device from FIGS. 1 and 2 with the secondary side detached, FIG. 4 a frequency dependence of a characteristic value of the secondary side from FIG. 1, with the secondary side connected and the secondary side detached and FIG. 5 the frequency dependence of the characteristic value from FIG. 4 with the secondary side detached and with the secondary side connected for different values of a capacitance of the secondary side.

FIG. 1 shows an energy transmission device with a primary coil 10 integrated into a kitchen working surface 30 and with a secondary coil 12 integrated into a coffee machine 50. The energy transmission device is used for wireless inductive transmission of electromagnetic energy with an energy transmission frequency $\omega_E$ from the primary coil 10 to the secondary coil 12. Using a stand 32 an operator can change the transmitted power by adjusting the energy transmission frequency $\omega_E$. As well as the coffee machine 50 a plurality of further kitchen appliances are equipped with corresponding secondary coils. A circuit integrated into base of the coffee machine 50 forms a secondary side 16 of the energy transmission device.

A primary side 30 of the energy transmission device integrated into the kitchen working surface includes a sensing means 14 for detecting an impedance which forms a characteristic value Z of the secondary side 16. The sensing means 14 includes a frequency generator 34 for generating a measurement voltage $U_{mess}$ with a measurement frequency $\omega_M$ and an induction coil 36, with which a further induction coil 38 interacts into which the sensing means 14 inductively couples in the measurement voltage $U_{mess}$ (FIG. 2). The further induction coil 38 is connected directly to the primary coil 10 into a circuit. The circuit of the primary coil at 10 includes an alternating current source 40 with a converter 42 which generates a voltage resonating with the energy transmission frequency $\omega_E$ and feeds it into the circuit. A capacitor 18 is connected in parallel to the primary coil 10 which expands the primary coil 10 into a parallel resonant circuit 22 of which the free resonant frequency $\omega_R$ essentially corresponds to the measurement frequency $\omega_M$. The secondary side 16 can also be removed by the operator during energy transmission.

In the alternating current source 40 direct current is first generated from a domestic power network using a rectifier not shown in the diagram, which is then transformed by the converter 42 into alternating current with the energy transmission frequency $\omega_E$. On the secondary side 16 the transmitted energy is rectified again using a rectifier and subsequently transformed electronically into a useful frequency. In alternative embodiments of the secondary side 16, especially with pure resistive secondary-side load, the energy transmission frequency $\omega_E$ can also be used directly without any intermediate transformation.

The measurement frequency $\omega_M$ is larger by a multiple than the energy transmission frequency $\omega_E$. In the present example the measurement frequency $\omega_M$ amounts to 2.8 MHz, while the energy transmission frequency $\omega_E$ lies in the region of a few hundred kHz.

Via the induction coils 36, 38 the sensing means 14 couples a measurement voltage $U_{mess}$ into the resonant circuit 22 and excites this into oscillation provided the secondary side 16 is decoupled. Using a resistance measurement device 44 the sensing means 14 determines the amount of impedance effective at the induction coil 36 at the measurement frequency $\omega_M$, which is used as a characteristic value Z for the presence of the secondary side 16 (FIGS. 3 and 4).

The secondary side 16, in addition to the secondary coil 12, includes at least formally a leakage inductance 46, of which the magnetic field is not fed back into the primary coil 10 but is scattered. The leakage inductance 46 is connected with a capacitor 20 into a series resonance which forms a second resonant circuit 24 embodied as a series resonant circuit. A load of the secondary side 16 can be replaced in the basic circuit diagram (FIG. 2) by a load resistor 48.

Both the primary coil 10 and also the secondary coil 12 include iron cores not shown explicitly in the diagram, so that the primary coil 10 and the secondary coil 12 each form one half of a transformer. The ratio of the number of windings of the primary coil 10 and the secondary coil 12 is tailored to the voltage needed on the secondary side 16.

If the transformer formed by the primary coil 10 and the secondary coil 12 is closed, the sensing means 14 couples the measurement voltage $U_{mess}$ via the inductive interaction between the primary coil 10 and the secondary coil 12 into the second resonant circuit 24 embodied as a series resonant circuit so that the resonance of the first resonant circuit 22 is disturbed. The first resonant circuit 22 is short circuited via the second resonant circuit 24 and an effective main inductance of the primary coil 10 in the equivalent circuit diagram increases sharply from a value $Lh_t$ to a much greater value $Lh_s$ (FIG. 2).

The energy transmission device also includes a means 28 for detecting a primary side operating current $I_p$ and a switching means 26 for activating and/or deactivating the energy transmission as a function of the sensed characteristic value Z.

FIG. 4 shows the frequency dependency of the characteristic value Z with the secondary side 16 present in the form of a dashed line and with the secondary side 16 detached in the form of a solid line. If an operator removes the secondary side 16, the characteristic value Z increases abruptly through a resonance magnification factor caused by the resonant circuit 22 from a value $Z_2$ to a value $Z_1$. The value $Z_1$ of the characteristic value Z lies above a threshold value $Z_s$, above which the switching means 26 switches off the alternating current source 40 in order to avoid energy losses and a radiation load on the environment. If the value of the characteristic value Z on the other hand falls below the threshold value $Z_s$, the energy transmission device detects the secondary side 16 and activates the alternating current source 40 via the switching means 26. Subsequently the value of the primary-side working current $I_p$ detected by the means 28 is checked. If a value that is too great indicates a value of the load resistance 48 that is too low, the switching means 26 initiates a safety shutdown.

FIG. 5 shows the frequency-dependent curve of the characteristic value Z for a number of values of the capacitance of the secondary-side capacitor 20. Embodiments of the invention are conceivable in which different secondary-side devices feature capacitors 20 with different capacitances, with the value of the capacitor encoding a device type. The device type can thus be deduced from a measurement of the characteristic value Z.

REFERENCE SYMBOLS

10 Primary coil
12 Secondary coil
14 Sensing means
16 Secondary side
18 Capacitor
20 Capacitor
22 Resonant circuit
24 Resonant circuit
26 Switching means
28 Means
30 Kitchen work surface
32 Stand 34 Frequency generator
36 Induction coil
38 Induction coil
40 Alternating current source
42 Converter
44 Resistance measurement device
46 Leakage inductance
48 Load resistor
50 Coffee machine
$U_{mess}$ Measurement voltage
$\omega_E$ Energy transmission frequency
$\omega_R$ Resonant frequency
$\omega_M$ Measurement frequency
Z Characteristic value
$l_P$ Working current
$Z_1$ Value
$Z_2$ Value
$Z_s$ Threshold value
$Lh_s$ Value
$Lh_t$ Value

The invention claimed is:

1. An energy transmission device comprising:
   a.) a primary side including a primary coil;
   b.) a detachable secondary component including a secondary coil, the primary coil being operable to inductively transmit electromagnetic energy to the secondary coil with such transmitted electromagnetic energy being characterized by an energy transmission frequency; and
   c.) a sensing means provided to the primary side for detecting at least one characteristic value of the detachable secondary component, the sensing means coupling a measurement voltage with a measurement frequency transmitted from the primary side to the secondary side that differs from the energy transmission frequency transmitted into the secondary coil by the primary coil.

2. The energy transmission device as claimed in claim 1 and further comprising at least one condenser for expanding at least one coil into an electromagnetic resonant circuit.

3. The energy transmission device as claimed in claim 2, wherein a resonant frequency of the resonant circuit corresponds at least essentially to the measurement frequency.

4. The energy transmission device as claimed in claim 1 and further comprising a primary-side resonant circuit and a secondary-side resonant circuit.

5. The energy transmission device as claimed in claim 1, wherein the measurement frequency is coupled inductively into the primary coil.

6. The energy transmission device as claimed in claim 1 and further comprising a switching means for selectively activating or deactivating an energy transmission depending on the sensed characteristic value.

7. The energy transmission device as claimed in claim 1 and further comprising a means for detecting a primary-side working current.

8. The energy transmission device as claimed in claim 1, wherein the sensing means detects a characteristic value produced by an impedance of the secondary coil at the measurement frequency.

9. The energy transmission device as claimed in claim 1, wherein the characteristic value relates to suitability of the secondary component to receive electromagnetic energy from the primary coil.

\* \* \* \* \*